United States Patent

Andrews

[15] 3,701,141

[45] Oct. 24, 1972

[54] WARNING SYSTEM WITH PLURAL IDENTIFICATION OF SIGNALLING STATIONS

[72] Inventor: Clifton B. Andrews, North Pembroke, Mass.

[73] Assignee: The Protectowire Co., Hanover, Mass.

[22] Filed: April 29, 1971

[21] Appl. No.: 138,470

[52] U.S. Cl. ..................................340/287, 340/293

[51] Int. Cl. ..........................................G08b 25/00

[58] Field of Search......340/164, 286, 216, 313, 409, 340/274, 287, 293, 420

[56] References Cited

UNITED STATES PATENTS

| | | | |
|---|---|---|---|
| 3,500,377 | 3/1970 | Meuther | 340/287 |
| 3,484,771 | 12/1969 | Falck, Jr. | 340/216 |
| 3,448,443 | 6/1969 | Weld | 340/287 |
| 3,150,359 | 9/1964 | Hoey | 340/276 X |
| 2,699,541 | 1/1955 | Ward | 340/293 |
| 3,540,043 | 11/1970 | Crosthwait | 340/420 |

*Primary Examiner*—Donald J. Yusko
*Attorney*—Sewall P. Bronstein, John D. Woodberry, Robert T. Gammons, Donald Brown, Robert L. Goldberg and Robert F. O'Connell

[57] ABSTRACT

A signalling system of the type with signalling devices stationed in protected premises and, upon actuation, transmitting a signal to a central receiving location. In the central receiving location, the system situates a plurality of zonal monitoring circuits, each of which is connected to and monitors a plurality of coded signalling devices forming a loop circuit. Each of the zonal monitoring circuits responds to reception of a coded signal by indicating through a first output path that a signal was received and by transmitting through a second output path the coded signal. At the receiving location, the receiver has an annunciator or indicator portion connecting with the first output paths of the zone circuits to indicate, for example by lighting a lamp, from which particular zone a signal originated. Also at the receiving location, a recorder portion is provided which connects in a loop with the second output paths of the zone circuits, and which both receives and records the coded signal, thereby providing a dual basis for positively identifying the location of a particular signalling device which has been actuated.

In operation, the coded signalling devices provide a signal by opening their loop circuits. The zone circuits respond to this open circuit condition by de-energizing a relay which was energized through a loop circuit, which simultaneously removes a shunt placed across the zone circuit's second output path, closes a circuit through the first output path to provide an indication that a signal has been generated, and energizes a second relay which transfers the signalling device loop circuit into connection with the zone circuit loop for transmission of the coded signal to the recorder. When the coded signal is completed, a reset switch is closed to one again energize the first relay.

10 Claims, 3 Drawing Figures

INVENTOR
CLIFTON B. ANDREWS
BY Dike, Bronstein, Roberts & Cushman
ATTYS

WARNING SYSTEM WITH PLURAL IDENTIFICATION OF SIGNALLING STATIONS

BACKGROUND OF THE INVENTION

The field of the present invention relates to signalling systems which station signalling devices in an area to be protected, with signals sent to a central receiving location which is to identify the particular device which has been used to transmit a signal. Such signalling systems are in common use as fire alarms, burglar alarms, and various types of supervisory signalling services.

Typical signal initiating equipment in sending stations of such systems is set into operation either automatically, for example by the operation of a heat sensitive element, by the flow of water in a sprinkler system, or by the intrusion of a burglar, or manually, for example by pulling a lever on an alarm box or on a box used for transmitting a report by a watchman making his rounds.

Such systems are required to perform their intended function with the highest degree of dependability practically obtainable. One important function such systems must perform is the identification of the location of the device used for signalling. This information is what enables assistance or corrective action to be supplied where it is needed.

As heretofore constructed, dual basis signalling systems have been of the type in which a signal originating in the protected premises is sent through a pair of wires, arrives at the receiving location and there (a) activates a mechanism which supplies a code correlated to the pair of wires over which the signal is sent, which code is punched or printed to record the identify of the originating signal, and (b) activates an indicating lamp or annunciator drop to indicate the origin of the signal.

This type of system has the very serious inherent defect that an incorrect signal will be indicated both in the coded record and by the lamp or annunciator drop if the pair of wires associated with the desired signal is transposed with a pair of wires associated with some other protected premise. It can happen, therefore, that a misidentification of signal origin will occur and the signal system will supply misleading information. While careful checking will reveal if such a transposition has occurred, the signalling systems are sometimes miles in length and checking is very cumbersome.

SUMMARY OF THE INVENTION

Objects of the present invention are to provide a signalling system which positively and reliably indicates the location of the transmitting device, which easily permits detection of any error in identification, which provides safe operation by giving a positive indication if a circuit fault occurs, and which is inexpensive to make and easy to use.

According to the invention, the signalling system for indicating at a receiving location the identity of a particular device in the protected premises which has been actuated to transmit a signal comprises a plurality of zonal minitoring circuits, each of which monitors a plurality of signal devices located in the protected premises within a prescribed zone assigned to that circuit. The signalling devices are of the type which, upon actuation, transmit a unique coded signal to the zonal circuit. Upon receipt of a coded signal, the zonal monitoring circuits respond through two separate outputs. The zone circuits indicate through a first output path that a signal was received and transmit through a second output path the coded signal. At the receiving station, an indicator means, such as an annunciator, connects with the first output paths of the zone circuits and indicates from which particular zone a signal originated. Also at the receiving station, a recorder means connects with the second output paths of the zone circuits and records the transmitted coded signal. Since the coded signal originates from the protected premises, it will always be indicated correctly at the receiving station and provides a check against possible erroneous zone indications sent through the first output paths and indicated by the annunciator.

In preferred embodiments, the coded signalling devices in each zone are in a loop circuit and signal by opening the circuit in a code pattern. The zone circuits have their second output paths connected in a loop with the recorder means, and respond to opening of the signal device loop through relay means by connecting the signal device loop into the zone circuit loop for transmission of the coded signal to the recorder means, and by closing contacts in the first output path to announce to the indicator means that a coded signal has been received. In one highly practical embodiment, the zone circuit has the winding of a first relay connected in series with a power source through the signal device loop. The normally energized first relay has normally closed contacts shunting the second output path of the zone circuit and contacts for connecting power to a second relay. The second relay has contacts that transfer the signal device loop from its series connection with the first relay, to connection into the second output path of the zone circuit, which leads to the recording means. Reset means are provided for restoring the zone circuit to its initial condition, and test means are provided for simulating a signal from a signalling device. The reset means comprises switch means for temporarily energizing the first relay, and the test means comprises switch means for temporarily interrupting the circuit through the first relay winding and the power source. Preferably, the first relay winding is connected adjacent the ground terminal of the power source and the signal device loop is connected between the first relay winding and the positive terminal of the power source, so that a fault in the signal device loop in the form of a ground, an open circuit, or an open circuit with one side grounded, will result in a signal being sent to the receiving location.

These and other objects and novel aspects of the invention will be apparent from the following description of a preferred embodiment thereof.

DESCRIPTION OF THE PREFERRED EMBODIMENTS

Figure 1:
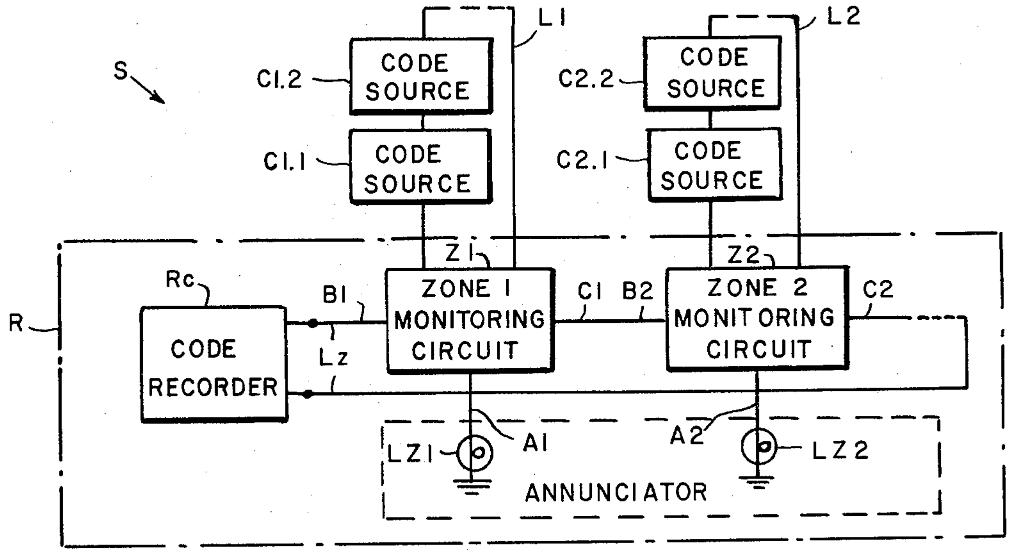
FIG. 1 is a diagram illustrating a signalling system according to the present invention.

FIG. 1 illustrates a signalling system S according to the invention and comprising, in a central receiving location, a receiver R with an annunciator portion RA, a recorder portion RC, and a plurality of zone monitoring circuits Z1, Z2, etc. The zone monitoring circuits Z1, Z2, etc. respectively monitor circuits L1, L2, etc., located in the protected premises and containing coded signalling devices assigned to a respective circuit's zone, with zone one circuit Z1 having in loop L1 the coded signalling devices C1.1, C1.2, etc.; loop circuit L2 of zone two circuit Z2 having coded signal devices C2.1, C2.2, etc. The zone circuits Z1, Z2, etc., have first output paths through terminals A1, A2, etc. leading to annunciator means RA with lamps LZ1, LZ2, etc., for indicating from which particular zone a signal has originated. The zone circuits Z1, Z2, etc., also have second output paths through terminal pairs B1, C1; B2, C2; etc., interconnected in series to form a zone circuit loop LZ with recorder means RC, adapted to record the coded signals originating in the coded signal devices and transmitted by the zone circuits. Since the coded signal originates in the protected premises within the coded signal devices, it is clear that the correct code will be transmitted to recorder means RC, and that any transposition which may occur in the lines forming loops L1, L2, etc., or in the lines from outputs A1, A2, etc., can be suitably detected by comparing the indication of annunciator means RA with the indication of recorder means RC.

Figure 2:
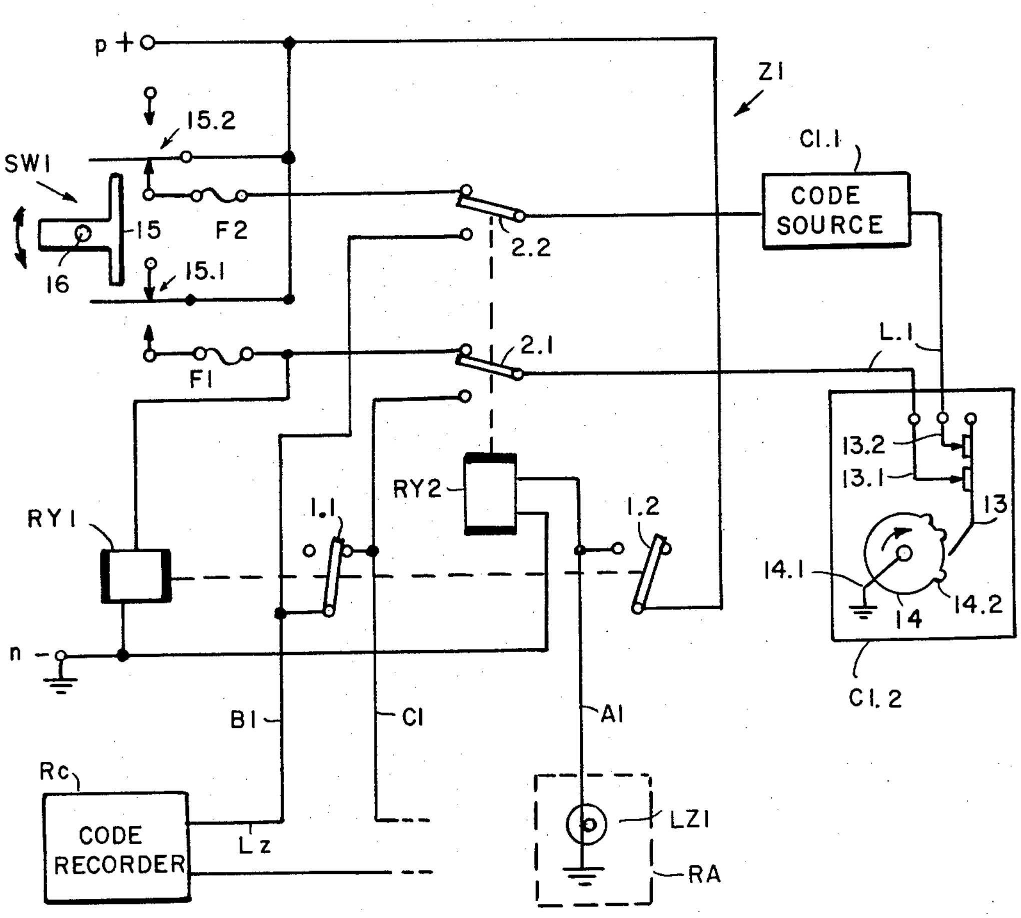
FIG. 2 is a schematic of the zone circuit and code signalling devices shown in FIG. 1.

FIG. 2 illustrates typical devices for the code signalling devices of FIG. 1, and typical circuitry for the zone monitoring circuits of FIG. 1, using zone circuit Z1 and code signalling devices C1.1 and C1.2 for the purpose of illustration.

The coded signalling devices work on the principle of loop interruption and have, as shown for device C1.2, a signalling contact spring 13 normally touching and completing a circuit through two loop contact springs 13.1 and 13.2, respectively. Contact spring 13 is positioned to be lifted out of contact by means of a code wheel 14 made of brass or other conductive material and having a permanent connection 14.1 to ground and, on its outer periphery, groups of coding teeth 14.2. The wheel and coding teeth are normally separated out of electrical contact. As the wheel is rotated in a clockwise direction, contact spring 13 touches the first tooth and grounds the loop L1; with additional rotation, the tooth 14.2 lifts spring 13 away from contacts 13.1 and 13.2 and the loop L1 is open circuited. The sequence of grounding of the loop and open circuiting of the loop is repeated for each tooth 14.2.

The code wheels of the signalling devices such as C1.2 are usually spring driven and they may be released either manually, mechanically or electrically. It is to be understood, however, that the coded signalling devices can operate at any desired manner so long as they provide the above described opening of the loop L1 into which they are connected.

Zone monitoring circuit Z1 is supplied with a source of direct voltage connected to terminals $p$ and $n$, with the higher potential connected to terminal $p$ and with terminal $n$ grounded. The signalling device loop L1 is connected in series with the winding of a relay RY1 and with the voltage source connected to terminals $p$ and $n$, through the normally closed switches 2.1 and 2.2 provided by a second relay RY2, through a fuse F2, and through the normally closed contacts 15.2 of a manually operated switch SW1 provided as described below for testing and resetting functions. Relay RY1 is normally energized by current passing through uninterrupted loop L1, and has a switch 1.1 normally providing a shunt across output terminals B1 and C1, and a normally opened switch 1.2 which, when closed, connects the voltage source at terminals $p$, $n$ through the winding of relay RY2. In addition, switch 1.2, when closed, connects the voltage source at terminals $p$, $n$ into output terminal A1 which leads to the annunciator means RA, where an indicator lamp LZ1 lights to announce the transmission of a signal from zone circuit Z1. Switches 2.1 and 2.2 of relay RY2 connect signal device loop L1 either in series with the winding of relay RY1 as indicated previously, or in series with output terminals B1 and C1 which connect into the zone circuit loop LZ which leads to the recorder means RC.

The normal state of zone circuit Z1 has signal device loop L1 intact, relay RY1 energized, and relay RY2 deenergized. When a signal device, such as device C1.2, is actuated and opens signal device loop L1, the circuit through the winding of relay RY1 is interrupted and the relay de-energizes. Switch 1.1 opens to remove the shunt across output terminals B1 and C1, and switch 1.2 closes to energize relay RY2 and light lamp LZ1 located in the annunciator means RA. Upon energization of relay RY2, switches 2.1 and 2.2 disconnect loop L1 from relay RY1 and connect it across output terminals B1 and C1. The foregoing operations all take place upon the very first interruption of loop L1 by the action of the first code tooth 14.2. As subsequent code teeth 14.2 come into play, the coded signal is transmitted directly into zone circuit loop LZ, and the relays RY1 and RY2 remain latched in their respective signalling states.

After a group of code signals has been transmitted from a device such as C1.2, zone circuit Z1 is restored to normal position by means of switch SW1. As indicated, switch SW1 has a toggle 15 pivoted at 16 and with normally open resetting contacts 15.1 providing an alternate series connection of the voltage source at terminals $p$, $n$ with the winding of relay RY1. By moving toggle 15 clockwise about its pivot 16, switch contacts 15.1 are closed to temporarily reconnect relay RY1, through fuse F1, to the voltage source. This results in the closing of switch 1.1 to restore the shunt across terminals B1, C1 and the opening of switch 1.2 to de-energize relay RY2 and lamp LZ1. When relay RY2 is de-energized, switches 2.1 and 2.2 reconnect signal device loop L1 between the relay RY1 and the voltage source at terminals $p$, $n$, and relay RY1 is then energized through loop L1. Switch contacts 15.1 are then opened and zone circuit Z1 is ready to detect another signal from loop L1.

Switch SW1 also enables the interconnection of the zone circuits with the receivers to be tested. As shown in FIG. 2, the energization path of relay RY1 includes normally closed contacts 15.2 of switch SW1. When opened by a counterclockwise rotation of toggle 15, the contacts 15.2 provide an interruption in the energization circuit of relay RY1 which simulates a similar interruption occurring in loop L1. While no code accompanies the interruption, the relays RY1 and RY2 will switch as if a signal had been given, and lamp LZ1 will be lighted to show the testing of zone circuit Z1 and the indicia on annunciator means RA can be compared with the lighting of lamp LZ1 to ascertain if correct correspondence is provided by the wiring connections from output terminals A1.

Relay RY1 is connected adjacent ground terminal *n* and is separated from the positive terminal *p* by means of signal device loop L1. Accordingly, various faults occurring in loop L1 will be treated by the zone circuit Z1 as a signal, and an indication will be given in the central receiving location which can be traced back by means of annunciator means RA to locate the source of the fault. For example, if loop L1 were to be open circuited, the de-energization of relay RY1 and ensuing switch operations would take place. Similarly, if loop L1 were grounded, relay RY1 would be shorted out, and its de-energization would result in a signal being sent to receiver R1. Similarly, a signal is given if loop L1 is broken and either side of the break is grounded. Thus, for all fault conditions in signal device loop L1, the zone circuit Z1 will provide notification that a fault has occurred.

The signals sent through output terminals A1, A2, etc. from zone circuit Z1, Z2, etc. reach annunciator means RA where indicator lamps LZ1, LZ2, etc., are lighted to identify the particular zone from which a signal has been received. Accordingly, each lamp will have some mark to identify the zone to which it corresponds. If there is any doubt that the indicated correspondence is correct, reference can be made to the recorder means RC which has received the coded signal. If desired, the indicating functions of the lamps LZ1, etc. can be supplied by annunciator drops or the like.

Figure 3:
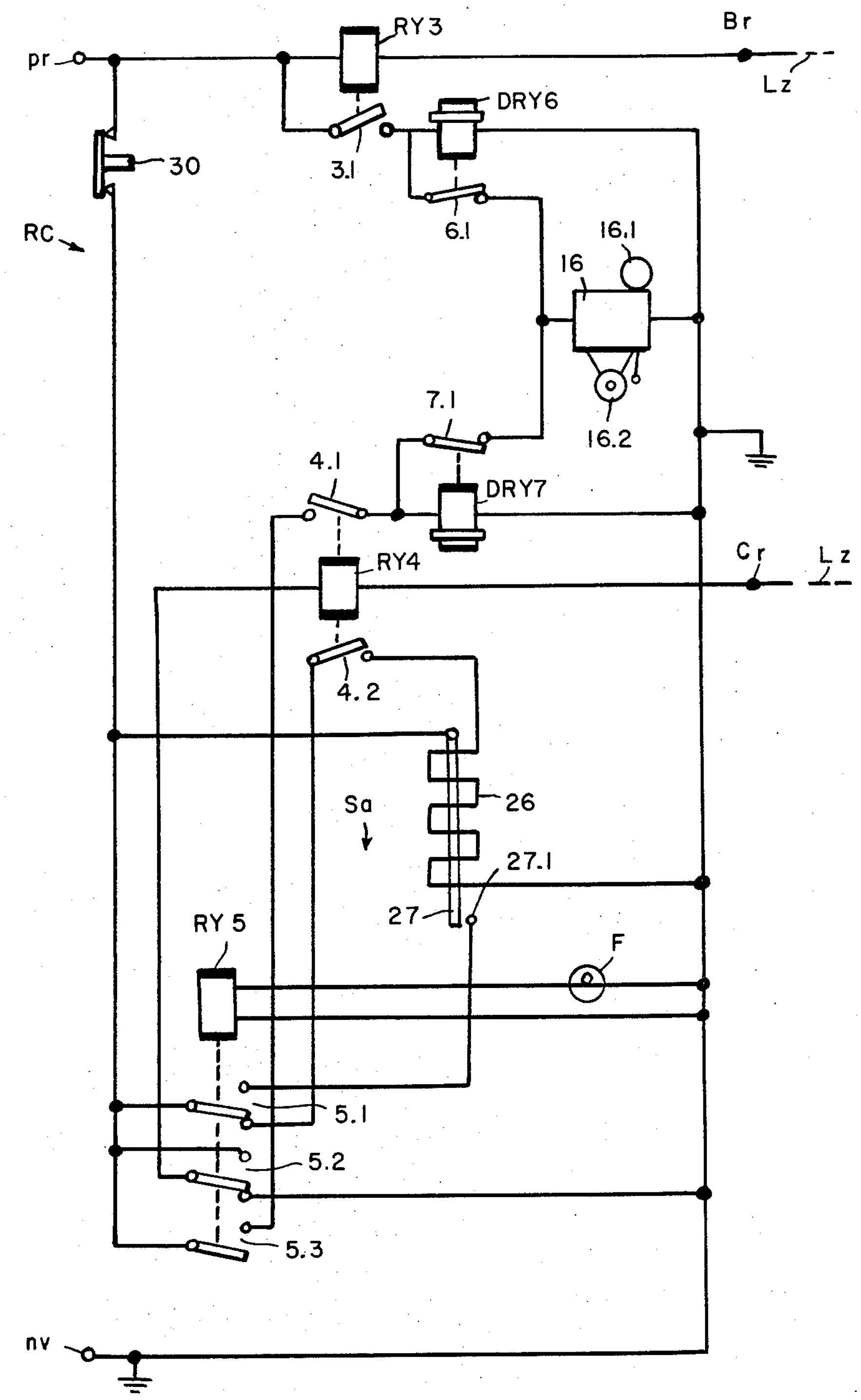
FIG. 3 is a schematic of part of the receiver illustrated in FIG. 1.

A typical unit suitable for use as recorder means RC is illustrated in FIG. 3. As shown, recorder means RC has input terminals Br and Cr for connection into the zone circuit loop LZ; and input terminals *pr* and *nr* for connection to positive and ground terminals, respectively, of a source of direct voltage provided for energization of relays RY3, RY4, RY5, delay relay DRY6, and delay relay DRY7.

When the receiver R2 is in normal standby condition awaiting receipt of a signal, the zone signal loop LZ forms a series circuit through the windings of relays RY3 and RY4, the voltage source at terminals *pr*, *nr*, and normally closed relay switch 5.2, with the result that the relays RY3 and RY4 are energized and relay switches 3.1 and 4.1 are open.

An alarm device 16 with a conventional code recording device 16.1 and an audible signalling device such as single stroke bell 16.2 is connected between ground terminal *nr* and positive terminal *pr* through two different paths, one including relay switches 3.1 and 6.1, and the other including relay switches 7.1, 4.1 and 5.3. The relay switches 6.1 and 7.1 are normally closed, actuated by delay relays DRY6 and DRY7.

The recorder means RC has a safety circuit Sa which includes relay RY5, a heating resistor 26, a bimetal strip 27 actuating switch 27.1, and fault indicator lamp F. A resetting push-button switch 30 is also provided.

The operation of recorder means RC takes place in the following manner. In normal operation, without faults, the recorder means RC responds to the receipt of a code signal, appearing as an opening in zone circuit loop LZ, by de-energizing relays RY3 and RY4, and closing switches 3.1 and 4.1 thereby actuating alarm 16 and recording the circuit opening on code recording device 16.1. Delay relays DRY 6 and DRY7 delay the opening of their switches 6.1 and 7.1 to permit recorder 16.1 to operate. Each opening and closing of the code signal device results in the energization and de-energization of relays RY3 and RY4 with attendant recording in recorder 16.1. In this manner recorder means RC provides a record of the particular code signal received, which can be compared with the indication given by annunciator means RA to ascertain the integrity of the system.

Recorder means RC makes use of its safety circuit to counteract various fault conditions. For example, if zone circuit loop LZ is broken, but not grounded, signals can be sent as a result of the different connections set up by the energization of relay RY5 after the fault has existed for a time interval causing bimetal switch 27.1 to close. Similarly, the safety circuit handles a fault in the form of a ground without a break in the zone loop LZ, or a break occurring simultaneously with a ground. As a result, the signalling system is able to continue operation over an extended range of conditions and its reliability is considerably enhanced.

It should be understood that the present disclosure is for the purpose of illustration and that this invention includes all modifications and equivalents which fall within the scope of the appended claims.

I claim:

1. A signalling system for indicating at a central receiving location the identify of a particular device in remote protected premises, which device has been actuated to transmit a signal, comprising a plurality of independent zonal monitoring circuits at said central receiving location, each of said zonal monitoring circuits being connected through separate connecting paths to a selected plurality of said signal devices located in said protected premises within a prescribed zone assigned to each said zonal monitoring circuits for monitoring said selected plurality of signal devices;

each of said signal devices upon actuation having means for transmitting a unique coded signal to its assigned zonal monitoring circuit;

each of said zonal monitoring circuits having means responsive to reception of a coded signal for indicating through a first output path that a signal was received and for transmitting through a second output path the coded signal; and at the receiving location, indicating means connecting with the first output paths of said zonal circuits for indicating the particular zone from which a signal originated, and recording means connecting with the second output paths of said zonal circuits for recording the transmitted coded signal.

2. A signalling system according to claim 1 wherein the signal devices in a prescribed zone are connected in a signal device loop with its assigned zonal monitoring circuit and transmit a signal by open circuiting said loop, the zonal monitoring circuits each having relay means responsive to open circuitry of said loop to close a relay switch in the first output path, the indicating means comprising for each zone an indicator device energized by the closing of said relay switch for that zone.

3. A signalling system according to claim 2 wherein said relay means is latched by the open circuiting of said signal device loop to maintain said relay switch closed, and wherein each zonal citcuit has reset means for restoring said relay means to a standby condition.

4. A signalling system according to claim 1 wherein said signal devices in each zone are connected in a signal device loop with the assigned zonal monitoring circuit, the zonal circuits have their second output paths connected in a zone circuit loop with said recording means, each zone having means for shunting said zone circuit loop, thereby to prevent interference with other zones, said zonal monitoring circuit transmitting said coded signal by removing said shunt and connecting said signal device into said zone circuit loop.

5. A signalling system according to claim 4 wherein said zonal monitoring circuits have relay means responsive to receipt of a coded signal, with relay switches connecting said signal devices into said zone circuit loop, said relay means latching upon receipt of a signal, said zone monitoring circuit having reset means to restore said relay means to standby condition.

6. A signalling system according to claim 4 wherein said signal device loop is connected in series with a power source and the winding of a normally energized first relay means through a pair of relay switches of a normally de-energized second relay means, said pair of relay switches having a second position connecting the signal device loop into said zone circuit loop when said second relay means is energized; the first relay means having a normally open relay switch for connecting the power source through the winding of the second relay means, and a normally closed relay switch for shunting the zone circuit loop at said second output path; whereby when said signal device loop is open circuited, said first relay means de-energizes, thereby removing the shunt from the zone circuit loop and energizing the second relay means, said second relay means transferring said signal device loop to said zone circuit loop and disconnecting said first relay from the power source.

7. Signalling device according to claim 6 wherein the normally open relay switch of said first relay means connects said power source through said first output path to thereby actuate said indicating means.

8. Signalling system according to claim 6 wherein said zonal circuit further comprises reset means for restoring the zone circuit to normal condition after a coded signal has been transmitted and said signal device loop is closed, said reset means comprising a switch temporarily connecting said power source through the winding of said first relay means to energize it, thereby returning the shunt to the zone loop, de-energizing the second relay means, and shifting said pair of relay switches to reconnect the signal device loop in series with the power source and first relay means winding.

9. Signalling system according to claim 6 wherein each zonal circuit further comprises testing means for simulating the transmission of a signal from said signal devices, comprising switch means for temporarily disconnecting said power source from the winding of said first relay means.

10. A signalling system according to claim 6 wherein said power source has a positive terminal and a ground terminal, the winding of the first relay means is connected adjacent said ground terminal, the signal device loop is connected through said pair of relay switches between said positive terminal and said first relay means winding, whereby a ground, open, or open with ground occurring in said signal device loop, all will cause said first relay means to become de-energized and cause said zonal circuit to react as if a signal had been given.

* * * * *